United States Patent
Schoenhuber

(10) Patent No.: US 7,427,082 B2
(45) Date of Patent: Sep. 23, 2008

(54) GAS GENERATOR

(75) Inventor: Georg Schoenhuber, Oberneukirchen (DE)

(73) Assignee: TRW Airbag Systems GmbH, Aschau Am Inn (DE)

( * ) Notice: Subject to any disclaimer, the term of this patent is extended or adjusted under 35 U.S.C. 154(b) by 302 days.

(21) Appl. No.: 11/220,057

(22) Filed: Sep. 6, 2005

(65) Prior Publication Data

US 2006/0186653 A1 Aug. 24, 2006

(30) Foreign Application Priority Data

Sep. 22, 2004 (DE) .................. 20 2004 014 775 U

(51) Int. Cl.
*B60R 21/26* (2006.01)

(52) U.S. Cl. ...................................... 280/736

(58) Field of Classification Search ................ 280/736, 280/740, 741; 102/530, 200, 202
See application file for complete search history.

(56) References Cited

U.S. PATENT DOCUMENTS

| | | | |
|---|---|---|---|
| 4,561,675 A * | 12/1985 | Adams et al. | ................ 280/734 |
| 4,944,528 A | 7/1990 | Nilsson et al. | |
| 5,186,491 A * | 2/1993 | Yoshida et al. | .............. 280/741 |
| 5,253,895 A | 10/1993 | Bretfeld et al. | |
| 5,704,640 A | 1/1998 | Monk et al. | |
| 5,772,243 A | 6/1998 | Green et al. | |
| 5,782,487 A | 7/1998 | Bauer et al. | |
| 6,126,197 A * | 10/2000 | Muir et al. | ................... 280/741 |
| 6,474,684 B1 * | 11/2002 | Ludwig et al. | .............. 280/741 |
| 6,620,269 B1 * | 9/2003 | Canterberry et al. | .......... 149/96 |
| 6,648,370 B2 * | 11/2003 | Koga et al. | ................... 280/736 |

FOREIGN PATENT DOCUMENTS

| | | |
|---|---|---|
| DE | 3824469 | 1/1990 |
| DE | 4138918 | 6/1992 |
| DE | 19618040 | 11/1997 |
| DE | 19805976 | 4/1999 |
| DE | 69713206 | 6/2002 |
| EP | 1264813 | 12/2002 |
| JP | 04342637 | 11/1992 |

* cited by examiner

*Primary Examiner*—Faye M. Fleming
(74) *Attorney, Agent, or Firm*—Tarolli, Sundheim, Covell & Tummino LLP

(57) ABSTRACT

A gas generator for use in a safety arrangement for vehicles comprises a combustion chamber and a gas-generating propellant contained in the combustion chamber, the propellant having an auto-ignition temperature of more than about 200 degrees C., and an outer wall having a wall section directly adjoining a part of the propellant. The wall section has a smaller wall thickness than the outer wall adjacent to the wall section and is arranged relative to the propellant so that the portion of the propellant adjoining the wall section heats up to the auto-ignition temperature under bonfire conditions faster than the propellant in the rest of the combustion chamber.

13 Claims, 2 Drawing Sheets

GAS GENERATOR

FIELD OF THE INVENTION

The invention relates to a gas generator for use in a safety arrangement for vehicles, comprising a combustion chamber and a gas-generating propellant contained in the combustion chamber, the propellant having a decomposition temperature of more than about 200 degrees C.

TECHNICAL BACKGROUND

Gas generators serve in vehicles in particular for the activation of vehicle occupant restraint systems, such as for example an inflatable impact protection cushion or gas bag or a pneumatic knee guard, in the case of a vehicle accident. They usually contain a pyrotechnic propellant, which after its ignition releases a gas mixture which is under high pressure, and activates the safety arrangement.

On exceeding a particular ambient temperature, e.g. in the case of a vehicle fire, the gas generators can be triggered in an uncontrolled manner and therefore also endanger people. Furthermore, it is known that the pyrotechnic propellants which are usually used do not react normally at increased temperature, but rather react in an accordingly accelerated and violent manner, in unfavourable circumstances even in the manner of an explosion. The housings of the gas generators are not designed for such a violent reaction and in so doing can fragment. Gas generators having light metal housings, in addition suffer from a weakening of the housing structure at higher ambient temperature. This effect can also lead to the housing fragmenting on reaction of the propellant. Under these circumstances, an increased risk of injury exists for the vehicle occupants.

Gas generators equipped with a pyrotechnic propellant therefore contain a so-called "auto-ignition device", which usually contains a primary explosive and is connected with a secondary explosive of the ignition device of the gas generator, or with the pyrotechnic propellant. The auto-ignition temperature of the primary explosive usually is in a temperature range of approximately 145 to less than 200 degrees C. As soon as the ambient temperature exceeds the auto-ignition temperature, the primary explosive of the auto-ignition device ignites and activates the secondary explosive or the pyrotechnic propellant. The propellant then reacts in a controlled manner, before the housing structure of the gas generator is weakened too greatly by the temperature rise or an undesirably violent reaction of the propellant can lead to a fragmenting of the gas generator.

An auto-ignition device of the type described above is known for example from the DE 38 24 469 C1. This auto-ignition arrangement comprises a metal housing incorporated into the outer wall of the gas generator housing, into which a primary explosive is introduced. The metal housing includes a window provided with a seal, with the window being directed to a secondary explosive of the ignition device or to the gas-generating propellant of the gas generator.

In the gas generator known from the U.S. Pat. No. 5,772,243 A, an auto-ignition charge, which spontaneously ignites at an ambient temperature of approximately 177 degrees C., is introduced into an annular groove in the igniter support. The annular groove, with the auto-ignition charge situated therein, is closed by a thin metal foil and is directed to the secondary explosive of the ignition device of the gas generator.

SUMMARY OF THE INVENTION

The invention has an object of providing a favourably priced gas generator, which is activated at an increased ambient temperature in a controlled manner and without fragmentation. Accordingly the invention provides a gas generator for use in a safety arrangement for vehicles, which comprises a combustion chamber and a gas-generating propellant contained in the combustion chamber, the propellant having an auto-ignition temperature of more than about 200 degrees C., and an outer wall having a wall section directly adjoining a part of the propellant. The wall section has a smaller wall thickness than the outer wall adjacent to the wall section and is arranged relative to the propellant so that the portion of the propellant adjoining the wall section heats up to its auto-ignition temperature under bonfire conditions faster than the propellant in the rest of the combustion chamber.

The gas generator according to the invention is sufficiently stable, despite the local weakening of the outer wall, under the normal operating conditions of a motor vehicle. It can also readily withstand brief storage temperatures in the range between approximately 130 and 135 degrees C. Furthermore, under bonfire conditions, i.e. in the simulation of a vehicle fire with a greatly increased ambient temperature, an accelerated heat transfer takes place, however, through the wall section with reduced wall thickness, so that the portion of the propellant adjoining this wall section heats up more quickly locally than the propellant in the rest of the combustion chamber.

Through the accelerated heat transfer owing to the smaller wall thickness in the region of the thinner wall section, shorter time is required up to reaching the auto-ignition temperature of the adjoining propellant, so that this portion of the propellant already ignites spontaneously when the remaining propellant is not yet fully heated through and hence reacts too violent, or the housing of the gas generator is already so intensively heated that a weakening of the housing structure occurs and the reaction of propellant leads to a fragmenting of the gas generator. As the propellant portion adjoining the thinner wall section is in direct contact with the propellant in the rest of the combustion chamber and is not separated therefrom, as is usual in separate auto-ignition devices, by a foil or by further components, the igniting of the propellant portion adjoining the wall section also leads without further delay to the controlled reaction of the entire propellant.

The gas generator according to the invention no longer has any separate auto-ignition devices and also no admixing of auto-ignition charges to the gas-generating propellant or the ignition charge. Thereby, the costs are dispensed with for the additional auto-ignition material and the components necessary for producing the auto-ignition device, such as for example the metal foil for closing the auto-ignition device. In addition, the effort of installing the auto-ignition device during the production of the gas generator is dispensed with and the danger of a faulty build-up of components is eliminated. Finally, a greater freedom exists in the selection of the pyrotechnic propellant, because the compatibility of auto-ignition charge and propellant no longer has to be taken into account.

The wall section can have a 30% to 80% smaller wall thickness relative to the adjacent outer wall area. A wall thickness reduction of less than about 30%, will not result in an effective spontaneous ignition of the adjacent propellant under bonfire conditions, because the heat transfer through the wall section will not take place substantially faster in this case than through the adjacent outer wall area. A wall thickness reduction of more than about 80%, on the other hand, does not produce any further acceleration of the spontaneous ignition in the bonfire test.

According to a particularly preferred embodiment of the invention, the thinner wall section and the outer wall are formed in one piece with each other. The wall thickness reduction in the region of the wall section can already be introduced during the production process of the components of the outer wall, for example by punching, stamping, thin-drawing or thin-rolling, or by subsequent material removal on the components, such as for example by a machining process such as drilling, milling or grinding.

The wall section can comprise for example a recess extending from the exterior in the direction of the combustion chamber, i.e. can thererfore be open towards the exterior, and in particular can be constructed as a groove extending over a region of the outer wall.

Advantageously, however, the wall section comprises a recess extending outwards, originating from the combustion chamber, which is open towards the combustion chamber. The outer wall can be defined by at least one of an igniter support and the outer housing of the gas generator, and the recess can be formed in at least one of the igniter support and the outer housing. The recess which is open towards the combustion chamber therefore forms a nesting space for a portion of the propellant in the combustion chamber.

A further preferred embodiment of the invention is a gas generator for use in a safety arrangement for vehicles, comprising a combustion chamber and a gas-generating propellant contained in the combustion chamber, wherein the propellant has an auto-ignition temperature of more than about 200 degrees C. In the combustion chamber a nesting space is provided, directly connected with the combustion chamber, in which a portion of the gas-generating propellant is held, the nesting space being arranged in the combustion chamber so that the portion of the propellant in the nesting space heats up to its auto-ignition temperature under bonfire conditions faster than the propellant in the rest of the combustion chamber.

The advantages described above are also achieved with this embodiment of the invention. In particular, the provision of separate auto-ignition devices or the admixing of auto-ignition charges to the gas-generating propellant or the ignition charge are dispensed with, which contributes to a simpler and more favourably priced production. Under bonfire conditions, i.e. in the simulation of a vehicle fire with greatly increased ambient temperature, the portion of the propellant situated in the nesting space is heated up faster locally according to the invention than the propellant in the rest of the combustion chamber.

The locally limited heating of the propellant situated in the nesting space can be achieved advantageously in that the nesting space is formed in a depression in the outer housing of the gas generator or the igniter support, which has a wall section with a reduced wall thickness as compared to the adjacent outer wall defined by at least one of the igniter support and the outer housing. Thereby, the heat transfer onto the propellant in the nesting space is accelerated compared with the propellant in the rest of the combustion chamber. Through the accelerated heat transfer owing to the smaller wall thickness of the wall section adjoining the nesting space, a shortening takes place of the time up to the auto-ignition temperature of the propellant being reached, so that the propellant already ignites in the nesting space when the rest of the propellant is not yet fully heated through and hence reacts too violent, or the housing of the gas generator is already so intensively heated that a weakening of the housing structure occurs and the reaction of propellant leads to a fragmenting of the gas generator.

As the propellant in the nesting space is in direct contact with the propellant in the rest of the combustion chamber and is not separated therefrom by a foil or further components, the igniting of the propellant in the nesting space also leads without further delay to the controlled reaction of the whole propellant.

A particular advantage of the gas generator according to the invention is that the gas generator no longer contains any auto-ignition charge, but rather only the pyrotechnic propellant with an auto-ignition temperature of more than 200 degrees C. has to be filled into the combustion chamber. The size and the volume of the nesting space can be matched to the propellant geometry so that a portion of the propellant filled into the combustion chamber comes to lie conclusively in the nesting space. Under bonfire conditions, with an ambient temperature increased over the usual operating conditions, such as for example in the case of a vehicle fire, only the portion of the propellant which lies in the nesting space is then exposed locally to an increased temperature through the faster heat transfer to the propellant. This portion of the propellant therefore reaches its auto-ignition temperature faster than the propellant in the rest of the combustion chamber, which at this moment is not yet fully heated through and therefore reacts in a controlled manner without causing a fragmenting of the gas generator housing.

According to a further embodiment of the invention, a heat sink is formed in the region of the wall section delimiting the nesting space. To provide for the heat sink, the wall section is insulated thermally with respect to the adjacent region of the outer housing or of the igniter carrier, so that the heat transfer runs even more quickly in the region of the nesting space, because no dissipation of heat takes place into the adjacent outer wall, i.e. the remaining parts of the outer housing or of the igniter support.

DETAILED DESCRIPTION OF PREFERRED EMBODIMENTS

Figure 1:
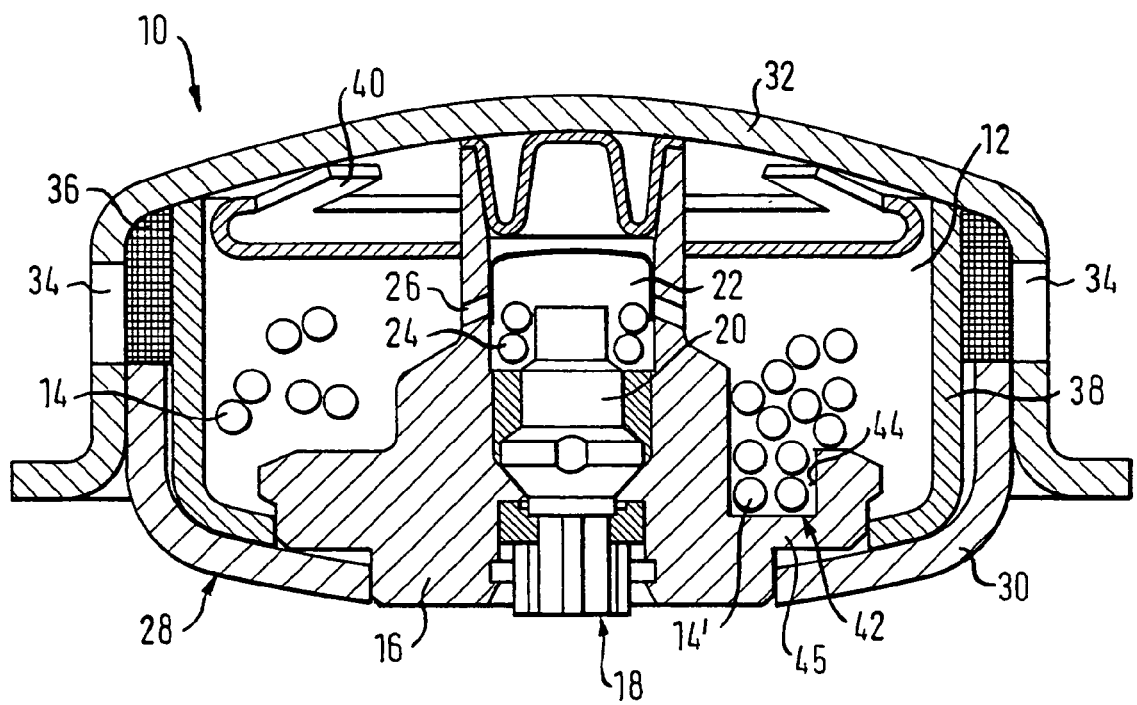
FIG. 1 shows the diagrammatic sectional view of a gas generator according to the invention.

The gas generator 10 illustrated in FIG. 1 has a combustion chamber 12, which contains a pyrotechnic propellant 14. The pyrotechnic propellant 14 has an auto-ignition temperature of more than 200 degrees C. and is free of admixtures of an auto-ignition charge. Preferably, the propellant is produced using a guanidine compound, such as guanidine nitrate, for example. Guanidine nitrate has an auto-ignition temperature of approximately 230 degrees C. If the auto-ignition temperature of the pyrotechnic propellant 14 lies below 200 degrees C., the storage stability of the gas generator may be insufficient. In gas generators with a light metal housing, the auto-ignition temperature of the propellant 14 is not to exceed approximately 280 degrees C., because at ambient temperatures above 280 degrees C., already a noticeable weakening of the housing structure can occur. In gas generators with a steel housing, on the other hand, higher auto-ignition temperatures of the propellant 14 are also acceptable.

The gas generator 10 further comprises an igniter support 16 consisting of steel or light metal, such as aluminium, which projects into the combustion chamber 12 and in which an ignition device 18 is held. The ignition device 18 comprises an igniter 20 which adjoins a sleeve-shaped ignition chamber 22 formed in the igniter support 16, which is filled with a secondary explosive 24 and is connected with the combustion chamber 12 via radial bores 26.

The igniter support 16 is securely connected with an outer housing 28 formed from steel or light metal, which consists substantially of a cup-shaped base part 30, in which the igniter support 16 is held, and of a cover 32 placed onto the base part 30 and connected therewith. The cover 32 has radial discharge openings 34 distributed over its periphery, in front of which a filter ring 36 is arranged for cooling the gas stream emerging from the discharge openings 34 and for separating entrained hot particles. The base part 30 and the igniter support 16 together form an outer wall. In this embodiment, therefore, the outer wall is composed of several parts of the gas generator 10.

The combustion chamber 12 is defined by the igniter support 16 and a combustion chamber wall 38 secured on the igniter support 16, which in the gas generator 10 of FIG. 1 is additionally connected with the cover 32 of the outer housing 28. The propellant 14 in the combustion chamber 12 is held by a pre-stressed spring plate 40, applied against the cover 32, in the combustion chamber 12. In this way, the occurrence of undesired rattling noises is eliminated.

In the igniter support 16, a nesting space 42 is provided connected directly with the combustion chamber 12, in which a portion 14' of the propellant 14 is filled. The volume and size of the nesting space 42 are dimensioned so that with a filling of the propellant 14 into the combustion chamber 12, a portion 14' of the propellant 14 also comes to lie in the nesting space 42.

In the gas generator shown in FIG. 1, the nesting space 42 is formed by a depression in the form of a bore 44 open towards the combustion chamber 12. The wall section 45 of the outer wall formed by the igniter support 16 and the base part 30 of the outer housing 28 on the base of the bore 44 delimits the nesting space 42 to the exterior and has a reduced wall thickness compared with the adjacent outer wall. Instead of a bore 44, several bores can also be provided, distributed over the periphery of the igniter support 16. As an alternative to this, the nesting space 42 can also be formed by one or more grooves encircling in a ring shape. Finally, in other types of gas generator construction it is also possible to form the nesting space 42 in the outer housing 28 by one or more depressions having a reduced wall thickness.

The reduction of the wall thickness of the outer housing 28 and the igniter support 16, delimited to the region of the nesting space 42, can already be introduced during the manufacturing process of the components, for example by punching, stamping, thin-drawing or thin-rolling, or by subsequent material removal on the components, such as for example by a machining process, such as drilling, milling or grinding.

Under bonfire conditions with greatly increased ambient temperature such as, for example, in a vehicle fire, owing to the reduced wall thickness of the bore 44 defining the nesting space 42, a faster heat transfer takes place from the environment of the gas generator 10 to the propellant 14' situated in the nesting space 42. This portion of the propellant 14' therefore reaches its auto-ignition temperature faster than the propellant 14 in the rest of the combustion chamber 12. As soon as the auto-ignition temperature of the propellant portion 14' is reached in the nesting space 42, it ignites and thereby also activates the propellant 14 in the rest of the combustion chamber 12. At this moment, the structure of the gas generator housing 28 is not yet so weakened by the temperature rise that a fragmenting occurs through the reaction of the propellant 14. In addition, only the temperature of the propellant 14' in the nesting space 42 is increased locally, whereas the propellant 14 in the remaining part of the combustion chamber is not yet at an increased temperature which would produce a reaction occurring in the manner of an explosion. The propellant 14 in the combustion chamber 12 can thereby react in a controlled manner, without fragmentation of the housing 28. Through the reaction of the propellant 14 in the combustion chamber 12, the internal pressure in the gas generator 10 increases to such an extent that the connection between the combustion chamber wall 38 and the cover 32 is loosened and a discharge gap is produced. The gases released from the propellant 14 flow via this gap and the filter 36 and also the discharge openings 34 out from the gas generator 10 into the inflatable safety arrangement which is not illustrated here, such as a gas bag, for example. The releasing of the gases takes place in a controlled manner and hence without the risk of injury to the vehicle occupants.

Figure 2:
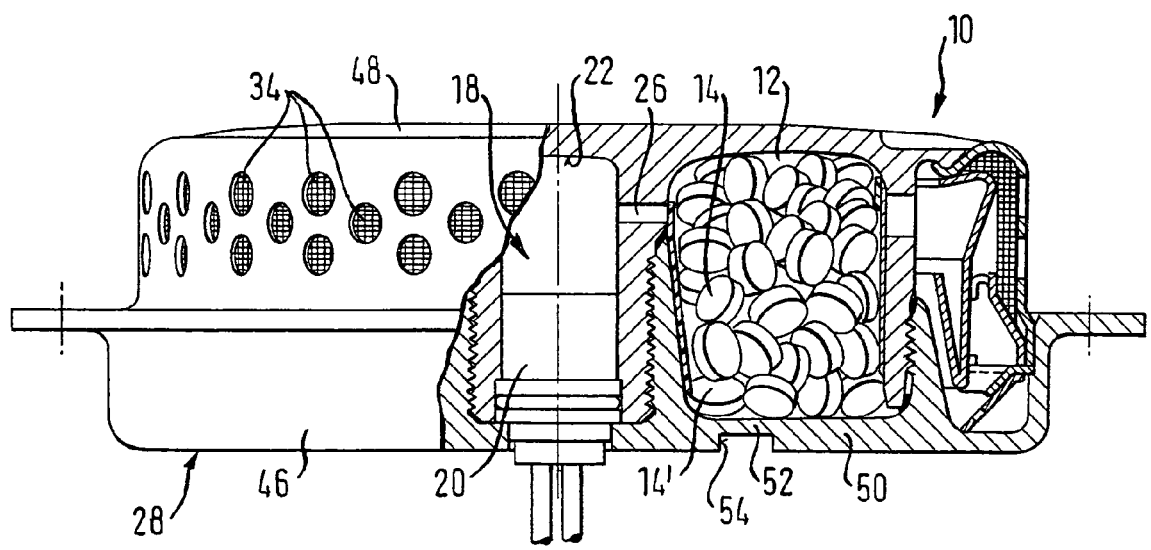
FIG. 2 shows the diagrammatic sectional view of a further embodiment of the gas generator according to the invention.

In the embodiment of the gas generator 10 illustrated in FIG. 2, parts having the same function are designated with the same reference numbers. In this respect, reference is made to the preceding description.

The outer housing 28 of the gas generator shown in FIG. 2 consists of steel or light metal such as aluminium, and comprises a lower shell 46 and an upper shell 48, which are screwed to each other and in the central region of which an ignition chamber 22 is formed to receive the ignition device 18 including the igniter 20. The lower shell 46 and the upper shell 48 in addition delimit the combustion chamber 12 arranged in a ring shape around the ignition chamber 22, which contains the pyrotechnic propellant 14 and is connected with the ignition chamber 22 via radial bores 26. The propellant 14 in the combustion chamber 12 has an auto-ignition temperature of more than about 200 degrees C. and preferably contains guanidine nitrate.

The lower shell 46 of the outer housing 28 comprises a base section 50 which, as part of the outer wall of the gas generator 10 defined by the outer housing 28, directly adjoins the combustion chamber 12 and the propellant 14 contained therein. In this base section 50, a wall section 52 is provided, which has a smaller wall thickness than the adjacent base section 50 and in the embodiment shown here is formed by a recess 54 introduced from the exterior into the base section 50. The recess 54 can, for example, be an annular groove with any desired cross-sectional profile introduced into the base section 50 by deformation or machining. Also, several annular grooves or several locally delimited recesses 54 distributed over the base section 50 can be provided. Under bonfire conditions, with intensively increased ambient temperature, such as for example in a vehicle fire, owing to the reduced wall thickness of the wall section 52, a faster heat transfer takes place from the environment of the gas generator 10 to the portion 14' of the propellant 14 in the combustion chamber 12 directly adjoining the wall section 52. This portion 14' of the propellant 14 therefore reaches its auto-ignition temperature faster than the propellant 14 in the rest of the combustion chamber 12. As soon as the auto-ignition temperature of the propellant portion 14' adjoining the wall section 52 is reached, this portion ignites and thereby also activates the remaining propellant 14. At this moment, the structure of the gas generator housing 28 is not yet so weakened by the temperature increase that a fragmentation occurs through the reaction of the propellant 14. In addition, only the temperature of the propellant portion 14' adjoining the thinner wall section 52 is increased locally, whereas the remaining propellant 14 in the combustion chamber 12 is not yet at an increased temperature. The propellant 14 can thereby react in a controlled manner, with normal reaction intensity. A fragmenting of the housing 28 is thereby reliably avoided.

The invention claimed is:

1. A gas generator (10) for use in a safety arrangement for vehicles, comprising a combustion chamber (12) and a gas-generating propellant (14,14') contained in the combustion chamber (12), the propellant (14,14') having an auto-ignition temperature of more than about 200 degrees C., and the gas generator (10) further comprising an outer wall (16, 30; 50) having a wall section (45; 52) directly adjoining the propellant (14), wherein the wall section (45; 52) has a smaller wall thickness than the outer wall (16, 30; 50) adjacent to the wall section (45; 52) and wherein the wall section (45; 52) is arranged with respect to the propellant (14) so that a portion (14') of the propellant (14) adjoining the wall section (45; 52) heats up to the auto-ignition temperature under bonfire conditions faster than the propellant (14) in the rest of the combustion chamber (12).

2. The gas generator according to claim 1, characterized in that the wall section (45; 52) has a wall thickness between about 30% and 80% less than the adjacent outer wall (16, 30; 50).

3. The gas generator according to claim 1, characterized in that the wall section (52) and the outer wall (50) are formed in one piece with each other.

4. The gas generator according to claim 1, characterized in that the wall section (52) comprises a recess (54) extending from the exterior in the direction of the combustion chamber (12).

5. The gas generator according to claim 4, characterized in that the recess (54) comprises a groove extending over a region of the outer wall (50).

6. The gas generator according to claim 1, characterized in that the wall section (45) comprises a recess (44) open towards the combustion chamber (12) and extending outwards.

7. The gas generator according to claim 4, characterized in that the outer wall is defined by one of an igniter support (16) and an outer housing (28) of the gas generator, or both, and the recess (44) is formed in the igniter support (16) or in the outer housing (28) and defines a nesting space (42) for the portion (14') of the propellant (14), the wall section (45) delimiting the nesting space (42) to the exterior.

8. A gas generator (10) for use in a safety arrangement for vehicles, comprising a combustion chamber (12) and a gas-generating propellant (14,14') contained in the combustion chamber (12), the propellant (14,14') having an auto-ignition temperature of more than about 200 degrees C., characterized in that in the combustion chamber (12) a nesting space (42) is provided, directly connected with the combustion chamber (12), in which a portion (14') of the gas-generating propellant (14) is held, the nesting space (42) being arranged in the combustion chamber (12) so that the portion (14') of the propellant (14) in the nesting space (42) heats up to said auto-ignition temperature under bonfire conditions faster than the propellant (14) in the rest of the combustion chamber (12).

9. The gas generator according to claim 8, characterized in that the gas generator (10) has an outer housing (28) and an igniter support (16) connected with the outer housing (28), the nesting space (42) being formed in at least one of the igniter support (26) and the outer housing (28).

10. The gas generator according to claim 8, characterized in that the nesting space (42) is formed by a depression (44) with reduced wall thickness.

11. The gas generator according to claim 9, characterized in that in the region of the nesting space (42) a heat sink is formed in relation to the at least one of the igniter carrier (16) and the outer housing (28).

12. The gas generator according to claim 1, characterized in that the propellant (14,14') has an auto-ignition temperature of at least about 225 degrees C., preferably between about 225 degrees C. and 280 degrees C.

13. The gas generator according to claim 1, characterized in that the propellant (14,14') comprises a guanidine compound.

* * * * *